OPTICAL ORIENTATION POSITION SENSOR FOR MULTICONTACT MINIATURE ELECTRONIC DEVICES

Filed July 14, 1965

INVENTOR
THOMAS J. RAJAC

BY George O. Saile
ATTORNEY

United States Patent Office 3,395,287
Patented July 30, 1968

3,395,287

OPTICAL ORIENTATION POSITION SENSOR FOR MULTICONTACT MINIATURE ELECTRONIC DEVICES

Thomas J. Rajac, Poughkeepsie, N.Y., assignor to International Business Machines Corporation, Armonk, N.Y., a corporation of New York Filed July 14, 1965, Ser. No. 471,907
7 Claims. (Cl. 250—221)

This invention relates to a sensor dexice which can determine at high speeds the orientation of the electrical contacts of a microminiature component.

Integrated circuit devices, whether individual active devices, individual passive devices, multiple active devices within a single chip or multiple passive and active devices within a single chip, require suitable input/output connections between themselves and other circuit elements or structures. These devices are typically very small, for example in the order of square mils, and fragile. Because of their size and fragility they are commonly carried on substrates for support. Machinery has been built that is capable of positioning the integrated circuit devices onto suitable substrates at very high rates of speed. The patent application U.S. Ser. No. 459,179 filed May 27, 1965, and assigned to the same assignee as the present invention describes such machinery for attaching integrated circuit devices to substrates. However, before an integrated circuit chip device can be positioned on a substrate, the orientation of the multicontacts of the device must be determined, so that the device can be properly positioned in a circuit configuration. The orientation of the chip device must be determined at a rate within a fraction of a second, since the integrated chip device positioning machinery can position the chip devices onto substrates at such speeds. An additional requirement, of course, for the orientation sensor device is that no harm is caused to the fragile integrated circuit device and its multicontacts extending therefrom.

It is therefore an object of this invention to provide an orientation sensor device for determining the orientation of integrated circuit chip device contacts.

It is another object of this invention to provide a chip orientation sensor which is capable of sensing the orientation of integrated chip devices at high rates of speed and without damaging the chips devices.

It is a further object of this invention to provide a low inertial orientation sensor device which produces little impact at high speeds and thereby guarantees the integrity of the chip device.

These and other objects are accomplished according to the broad aspects of the present invention by providing an integrated chip device orientation sensor which includes a transducer that is responsive to the position of the multicontacts of the integrated chip device in actuating an optical-electrical impulse which gives the orientation of the chip device. The high speed orientation sensor has a tilting transducer means which has a reflective surface on a first side and multiple pads with grooves between the pads on the side opposite to the first side. The transducer means is supported in a way which allows a force of less than approximately 60 grams to cause these transducer means to be tilted in one direction or another. A means is provided for placing the multicontact device onto the multiple pads to cause certain of the contacts to engage the pads and at least one contact to go into a groove. This means also applies a force against the engaged pads to cause the tilting of the transducer means. A light beam is projected against the reflective surface of the transducer means. When the transducer means is tilted in one direction or another the light beam is reflected a known amount to activate a light sensitive means which provides an electrical output in response to the light applied to it. The electrical output gives the necessary orientation information for the integrated circuit chip device. The chip device can thereafter be rotated by another apparatus or by hand to the desired position.

The foregoing and other objects, features and advantages of the invention will be apparent from the following more particular description of the preferred embodiments of the invention as illustrated in the accompanying drawings.

Figure 1:
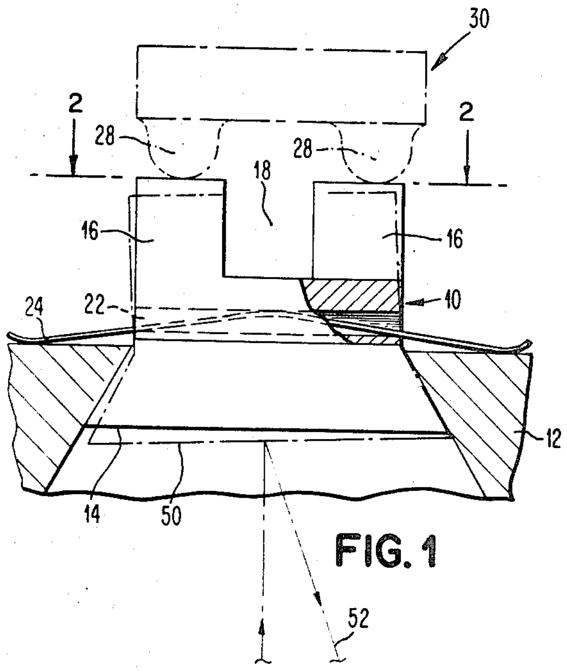
FIGURE 1 is a partially in cross section illustration of the tilting transducer means having a multicontact chip device thereon.
Figure 2:
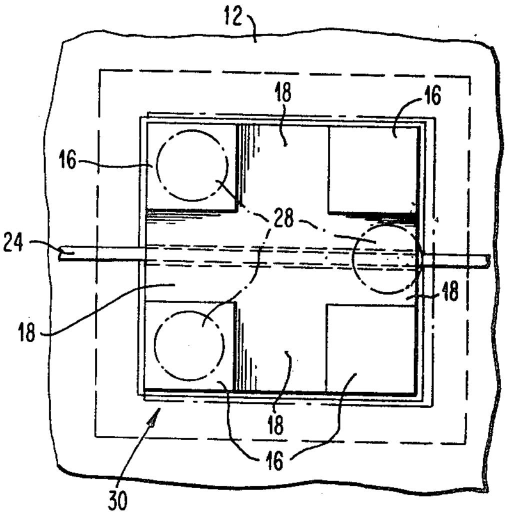
FIGURE 2 is a view of the FIGURE 1 along the line 2—2.

Referring now more particularly to FIGURE 1, there is shown the tilting transducer 10 which is situated in and completely surrounded by housing 12. The tilting transducer 10 has a reflective surface on a first side 14 which may be a mirror. FIGURE 2 shows the plane view of the side opposite to the reflective surface 14. Pads 16 are located in each of the corners of the rectangular shaped upper side of the tilting transducer means. Grooves 18 are located between the pads 16. A spring means 24 for continuously urging the transducer means into contact with the sloped portion of the housing 12 extends through the opening 22 in the tilting transducer 10. The spring means 24 for support rests on surfaces of the housing 12.

Figure 3:
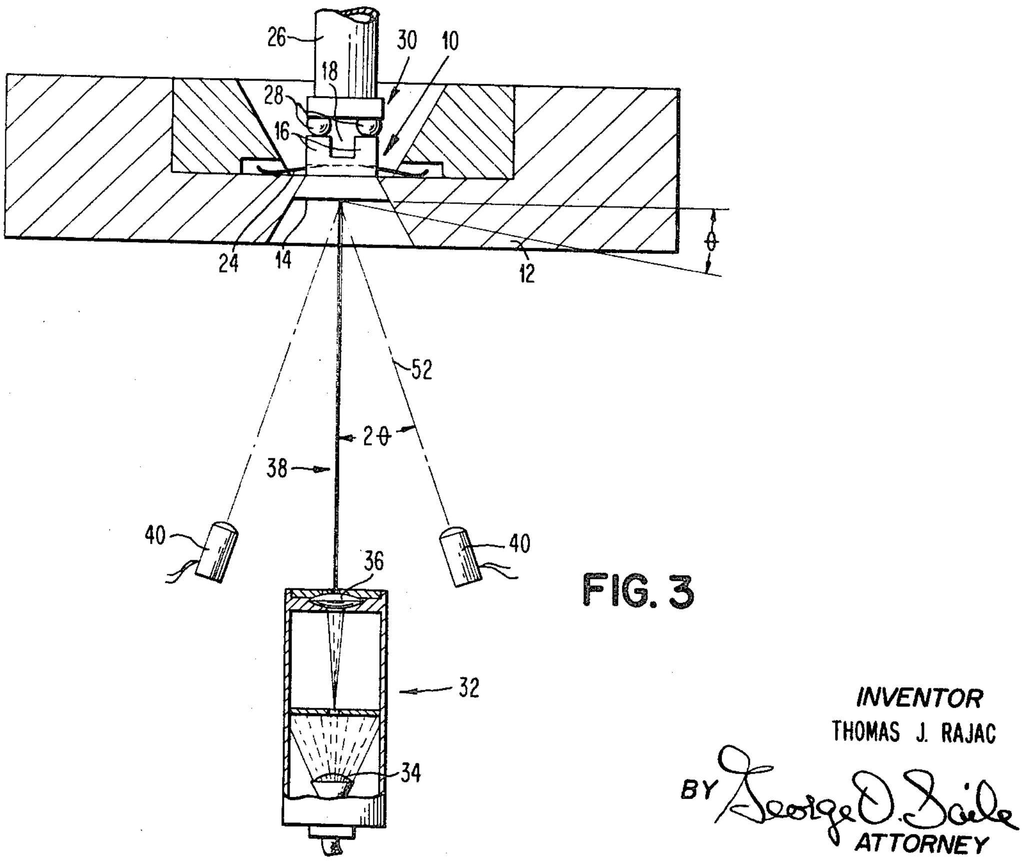
FIGURE 3 is an illustration showing the orientation sensor of the present invention.

The FIGURE 3 shows the overall view of the orientation sensor device. A means 26 is shown for placing the multicontact chip device 30 onto the side of the tilting transducer 10 having the multiple pads 16. The means 26, after engaging the pads 16, applies a force against the engaged pads 16 to urge the transducer means 10 away from the housing 12 and cause the tilting of the transducer means. The transducer means 10 is capable of tilting in one of several directions, and preferably in one of each of the four quadrants under the influence of the force applied to the pad. A collimated light projecting means 32, which may be made of a light source 34 and a collimating lense 36, projects a collimated light beam 38 onto the reflective surface 14 of the transducer means 10. When the transducer means tilts in one of the several directions the light beam applied to the reflective surface is thereby reflected. Means 40 for providing an electrical output in response to a light beam being applied to it are positioned to intercept the reflected light beam and to provide the information as to the presence of the reflected light beam to an information means (not shown) to indicate the orientation of the integrated circuit chip device. The chip device can then be rotated by another apparatus or by hand to the desired position.

The method employed to sense the integrated circuit device chip orientation is based on the movement of the tilting transducer 10 caused by the interference of at least 2 multicontacts 28 extending from the chip device with the pads 16 of the transducer and at least one multicontact entering a groove 18. The chip is preferably transported on the end of a vacuum probe 26 straight down onto the tilting transducer 10. Before sensing the orientation of the chip device, the chip device is partially oriented so that it is either contacts down or contacts up depending upon which selection is preferred by a previous operation. Also, the chip is squared with the transducer pad and groove surface when applied to the surface. As the chip is lowered against the tilting transducer 10, the transducer will tilt or revolve the transducer in the direction that will allow the two contacts to travel further than the third contact which is accommodated in the groove 18. The third ball enters the groove and does not displace the transducer as much as the other two balls. The result of this action is shown by the dashed line 50 and the reflected light beam 52 in FIGURE 1. The tilting of the transducer thus produced can be as much as 14°. The same effect is obtained in each of the four quadrants but is displaced by 90°, 180°, 270°. The overtravel of the vacuum probe carrying the chip allows the tilting transducer to leave the housing 12 thus freeing it to tilt as described. In addition to the compensations for overtravel of the probe, the spring means 24 also allows for variations in height of the multicontacts extending from the chip device. The deflection of the tilting transducer 10 deflects the collimated light beam 38 onto one of the four quadrant photoconductors 40 which in turn indicate the orientation of the chip device. High magnification of movement can be obtained by moving the photoconductor away from the tilting transducer 10 along the light reflection path. Furthermore, since the normal to the reflective surface has been displaced through the angle $\theta$, the reflective beam will be displaced $2\theta$. Thus the magnification of the motion is really equal to the ratio of the triangle formed by the angle $\theta$ between the chip device's multicontacts and the triangle of the photoconductors 40. The magnification factor becomes $M \doteq 2L/C$ where L is the vertical distance between the photoconductors and the pivot. C is the distance between the multicontacts in the plane of rotation.

While the invention has been particularly shown and described with reference to the preferred embodiments thereof, it will be understood by those skilled in the art that various changes in the form and details may be made therein without departing from the spirit and scope of the invention.

What is claimed is:

1. A high speed orientation sensor for a multicontact microminiature electronic device comprising:

- a tilting transducer means having a reflective surface on a first side and multiple pads with grooves between the pads on the side opposite to said first side;
- means for supporting said transducer means;
- means for placing said multicontact device onto the contacts to engage the pads and at least one contact to go into a groove and for applying a force against the engaged pads to cause the tilting of the said transducer means;
- said transducer means being capable of tilting in one of several directions;
- means for projecting a light beam onto said reflective surface of said transducer means; and
- means for providing an electric output in response to a light beam being reflected from the tilted said transducer means to sense the orientation of said multicontacts.

2. A high speed orientation sensor for a multicontact microminiature electronic device comprising:

- a tilting transducer means having a reflective surface on a first side and multiple pads with grooves between the pads on the side opposite to said first side;
- means for supporting said transducer means;
- means for placing three contacts of said multicontact device onto the said side having multiple pads to cause two of the contacts to engage the pads and one contact to go into a groove and for applying a force against the engaged pads to cause the tilting of the said transducer means;
- said transducer means being capable of tilting in each of the four quadrants under the influence of said force applied to said pads;
- means for projecting a light beam onto said reflective surface of said transducer means; and
- means for providing an electric output in response to a light beam being reflected from the tilted said transducer means to sense the orientation of said multicontacts.

3. A high speed orientation sensor for a multicontact microminiature electronic device comprising:

- a housing;
- a tilting transducer means, situated in and completely surrounded by said housing having a reflective surface on a first side and multiple pads with grooves between the pads on the side opposite to said first side;
- means continuously urging the said transducer means into contact with said housing;
- means for placing said multicontact device onto the said side having multiple pads to cause certain of the contacts to engage the pads and at least one contact to go into a groove and for applying a force against the engaged pads to urge the said transducer means away from the housing and cause the tilting of the said transducer means;
- said transducer means being capable of tilting in one of several directions under the influence of said force applied to said pads;
- means for projecting a light beam onto said reflective surface of said transducer means; and
- means for providing an electric output in response to a light beam being reflected from the tilted said transducer means to sense the orientation of said multicontacts.

4. A high speed orientation sensor for a multi-contact microminiature electronic device comprising:

- a housing;
- a tilting transducer means, situated in and completely surrounded by said housing having a reflective surface on a first side and multiple pads with grooves between the pads on the side opposite to said first side;
- means continuously urging the said transducer means into contact with said housing;
- means for placing three contacts of said multi-contact device onto the said side having multiple pads to cause two of the contacts to engage the pads and one contact to go into a groove and for applying a force against the engaged pads to urge the said transducer means away from the housing and cause the tilting of the said transducer means;
- said transducer means being capable of tilting each of the four quadrants under the influence of said force applied to said pads;
- means for projecting a collimated light beam onto said reflective surface of said transducer means; and
- means for providing an electric output in response to a light beam being reflected from the tilted said transducer means to sense the orientation of said multicontacts.

5. A high speed orientation sensor for a micro-miniature electronic device having multicontacts physically extending therefrom comprising:

- a housing;
- a tilting transducer means, situated in and completely surrounded by said housing having a reflective surface on a first side and a rectangular area with pads situated at each corner and grooves between the pads on the side opposite to said first side;
- means continuously urging the said transducer means into contact with said housing;
- means for placing three contacts of said multi-contact device onto the said side having pads to cause two of the contacts to engage the pads and one contact to go into a groove and for applying a force against the engaged pads to urge the said transducer means away from the housing and cause the tilting of the said transducer means;
- said transducer means being capable of tilting in under the influence of said force applied to said pads;
- means for projecting a collimated light beam onto said reflective surface of said transducer means; and means for providing an electric output in response to a light beam being reflected from the tilted said transducer means to sense the orientation of said multicontacts.

6. A high speed orientation sensor for a microminiature electronic device having multicontacts physically extending therefrom comprising:

a housing;

a tilting transducer means, situated in and completely surrounded by said housing having a reflective surface on a first side and a rectangular area with pads situated at each corners and grooves between the pads on the side opposite to said first side;

means continuously urging the said transducer means into contact with said housing;

means for placing three contacts of said multi-contact device onto the said side having pads to cause two of the contacts to engage the pads and one contact to go into a groove and for applying a force against the engaged pads to urge the said transducer means away from the housing and cause the tilting of the said transducer means;

said transducer means and housing having mutually engaging surfaces to prevent sidewise shifting of the said transducer means in absence of said force applied against said pads;

said transducer means being capable of tilting in each of the four quadrants under influence of said force applied to said pads;

means for projecting a collimated light beams onto said reflective surface of said transducer means; and means positioned in each of the four quadrants for providing an electric output in response to a light beam being reflected from the tilted said transducer means to sense the orientation of said multicontacts.

7. A high speed orientation sensor for a microminiature electronic device having multicontacts physically extending therefrom comprising:

a housing;

a tilting transducer means, situated in and completely surrounded by said housing having a reflective surface on a first side and rectangular area with pads situated at each corner and grooves between the pads on the side opposite to said first side;

a spring means which passes through an opening in said transducer means and otherwise rests on said housing for continuously urging the said transducer means into contact with said housing;

means for placing three contacts of said multicontact device onto the said side having pads to cause two of the contacts to engage the pads and one contact to go into a groove and for applying a force against the engaged pads to urge the said transducer means away from the housing and cause the tilting of the said transducer means;

said transducer means and housing having mutually engaging surfaces to prevent sidewise shifting of the said transducer means in absence of said force applied against said pads;

said transducer means being capable of tilting in each of the four quadrants under influence of said force applied to said pads;

means for projecting a collimated light beam onto said reflective surface of said transducer means; and means positioned in each of the four quadrants for providing an electric output in response to a light beam being reflected from the tilted said transducer means to sense the orientation of said multicontactes.

References Cited

UNITED STATES PATENTS

| | | | |
|---|---|---|---|
| 3,029,348 | 4/1962 | Heinz | 250—221 |
| 3,038,369 | 6/1962 | Davis | 250—232 X |
| 3,207,904 | 9/1965 | Heinz | 250—202 |
| 3,267,250 | 8/1966 | Uppery | 250—203 X |

JAMES W. LAWRENCE, *Primary Examiner.*

V. LAFRANCHI, *Assistant Examiner.*